June 30, 1970 R. M. SHELTON 3,518,642

MAGNETIC ASSOCIATIVE MEMORY

Filed Oct. 4, 1967 2 Sheets-Sheet 1

INVENTOR.
RICHARD M. SHELTON

BY Samuel Kane
ATTORNEY

MAGNETIC ASSOCIATIVE MEMORY

Filed Oct. 4, 1967 2 Sheets-Sheet 2

United States Patent Office 3,518,642

Patented June 30, 1970

3,518,642

MAGNETIC ASSOCIATIVE MEMORY

Richard M. Shelton, Conshohocken, Pa., assignor to Burroughs Corporation, Detroit, Mich., a corporation of Michigan Filed Oct. 4, 1967, Ser. No. 672,843

Int. Cl. G11c *15/00*

U.S. Cl. 340—174 2 Claims

ABSTRACT OF THE DISCLOSURE

A group of magnetic cores are uniquely threaded with input data conductors and output address conductors so that each core stores its address and a particular data word. A data word whose address is to be determined is placed into an input data register. The group of cores is then interrogated to determine if the input data word in the register is stored in any core of the group. If a core is found which is storing the input data word the address of the particular core is read out into an output address register.

BACKGROUND OF THE INVENTION

This invention relates generally to magnetic storage devices and more particularly to a fixed magnetic associative memory in which the memory data contents are determined in advance and do not change in normal operation. Memories of this type are variously referred to as "inside-out" memories, "tag" memories, "content-addressed," or "data-addressed" memories.

The present invention utilizes a core rope to implement its associative memory. The use of a core rope in a memory system is discussed in a report entitled "Design Principles for a General Control Computer" by R. Alonso and J. H. Laning, Jr., found in R–276, Instrumentation Laboratory, Massachusetts Institute of Technology, April 1960, and in a Technical Information Bulletin of Burroughs Corporation entitled "The D210 Magnetic Computer," Oct. 31, 1962.

SUMMARY OF THE INVENTION

One of the objects of the present invention is to provide improvements in fixed-data magnetic memories.

Another object of the present invention is to provide a random access, fixed, magnetic, associative memory.

Another object of the invention is to provide a static storage medium for digital processing devices and systems to perform those functions which are philosophically inverted from conventional memory operation.

A further object of the invention is to provide a fixed, random access associative memory having all the advantages of conventional, fixed magnetic memories with respect to economy, simplicity, reliability, speed, and power consumption.

Still a further object of the invention is to provide improvements in associative memories whereby every bit in the output is represented by a "true" signal.

A further object of the invention is to provide an associative memory which can distinguish between a mismatch and an all-zero address, and which can readily be implemented with logic circuitry to indicate the fact that a particular data word whose address was requested is not stored in memory.

Another object of the invention is to provide an associative memory which can readily be implemented with multiple output detection logic for determining the condition where more than one storage element is erroneously switched during readout.

In accordance with the above objects and considered first in one of its broader aspects, an associative memory in accordance with the invention may comprise a plurality of magnetic cores and a group of input data conductors each threading certain of the cores and bypassing the other cores in a coded pattern so that each core stores a data word, and in which each of the cores has half of the input data conductors threading it and the other half bypassing it. A group of output address conductors is provided, each threading certain of the cores and bypassing the other cores in a coded pattern so that each core stores its address code. A drive winding is provided which threads all of the cores, and a means is also provided for driving switching current through the drive winding which is capable of switching the cores from a reference state to a first state of magnetization. Further means is provided for driving inhibit current through a selected half of the data input conductors in a pattern corresponding to an input data word in an input data register and in the direction opposite to the switching current so that all cores except the one that is storing the input data word will not switch, the selected half of the input data conductors bypassing the excepted core. A switching means is provided for disturbing the state of magnetization of the excepted core to induce signals on the output address conductors which thread the excepted core, and a further means is provided for applying the induced signals for storing the address code of the excepted core in the output address register.

The invention will be more clearly understood when the detailed description of the preferred embodiment thereof, which follows shortly, is read in conjunction with the accompanying drawings which are described below.

DESCRIPTION OF THE PREFERRED EMBODIMENT

Figure 3:
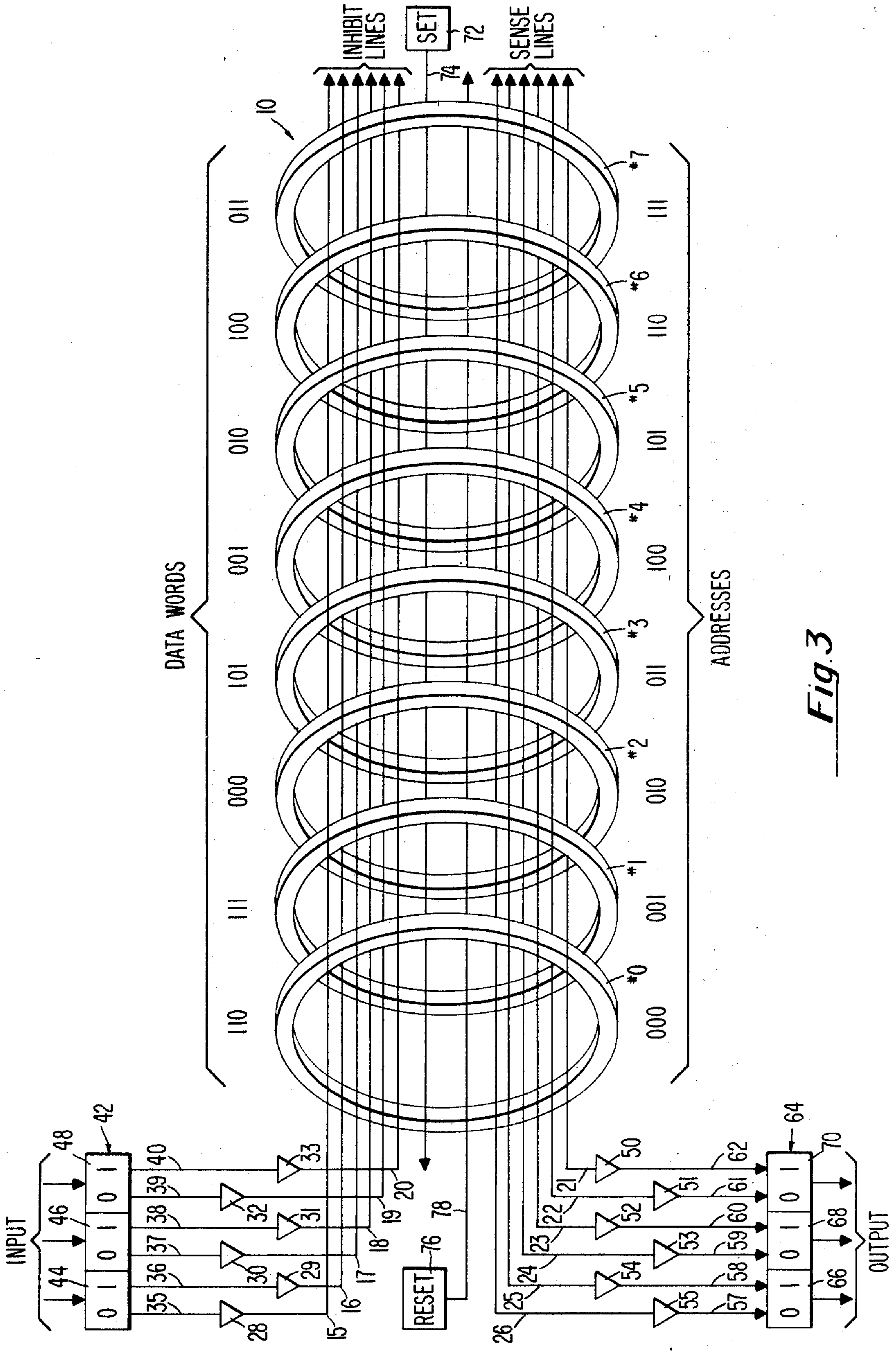
FIG. 3 is a diagrammatic illustration in greater detail of the memory system shown in FIG. 1.

Referring to the drawings, there is shown a toroidal magnetic core asembly 10 (FIG. 3) which is wired similar to a core rope. The core assembly can store N words of $m$ bits each. Thus there are N address locations which can be encoded by $n$ bits, preferably in binary code, each address capable of storing a data word which may be any one of $2m$ possibilities.

Accordingly, the memory system 10 contains a total of N cores; one core per word. A word is stored in a core by winding the core in the desired pattern with input data conductors which represent the bits of the word. The complement of the desired data pattern is also wound on the core with input data conductors so that there is a total of $2m$ input data conductors associated with the magnetic core assembly 10. The winding pattern is such that half of the input data conductors pass through a core and the other half bypass the core.

Similarly, there are $2n$ address wires, half of which go through any one core and the other half of which bypass that core. There is, then, a unique wiring combination for each core which corresponds to the binary address of that core.

A three-bit binary data word and a three-bit binary address have been chosen for purposes of illustration. Therefore $$m=3$$
$$n=3$$
$$N=2n=8 \text{ cores}$$

Thus the illustrative 8 magnetic cores #0–#7 are wired with $2m$ or 6 input data conductors or inhibit lines 15–20 and 2$n$ or 6 output address conductors or sense lines 21–26. The input data conductors 15–20 have been wound on the magnetic cores in an arbitrary fashion for purposes of illustration so as to store the data words whose binary code is indicated immediately above the cores. The output address conductors 21–26 have been wound on the magnetic cores so as to represent the binary addresses of the respective cores, these addresses being indicated in binary code immediately below the cores. Thus core #0 stores the data word 110, core #1 stores the data word 111, core #2 stores the data word 000, etc. Core #0 stores address 000, core #1 stores address 001, core #2 stores address 010, etc.

The input data conductors 15–20 are coupled through current drivers 28–33 and conductors 35–40 to an input data register 42. The input data register 42 may be constructed in one form, for example, of flip-flops 44, 46 and 48, each of which represents a binary bit. In order to store a binary 1 in a core, the input data conductor which is coupled to the 1 side of the particular flip-flop is threaded through the core and the complementary conductor which is coupled to the 0 side of the same flip-flop bypasses the core. If a binary 0 is to be stored in a core, the input data conductor which is coupled to the 0 side of the particular flip-flop is threaded through the core and the complementary conductor which is coupled to the 1 side of the same flip-flop bypasses the core. Thus, half of the input data conductors 15–20 pass through a core and the remaining half bypass the core.

In a similar manner, the output address conductors 21–26 are coupled through amplifiers 50–55 and output conductors 57–62 to an output address register 64 which may also be constructed, for example, of flip-flops 66, 68 and 70 each representing one binary bit. The output address conductors 21–26 are wound on the cores in unique patterns so that the output address conductors representing address bits pass through the cores and their complementary conductors bypass the cores.

Figure 1:
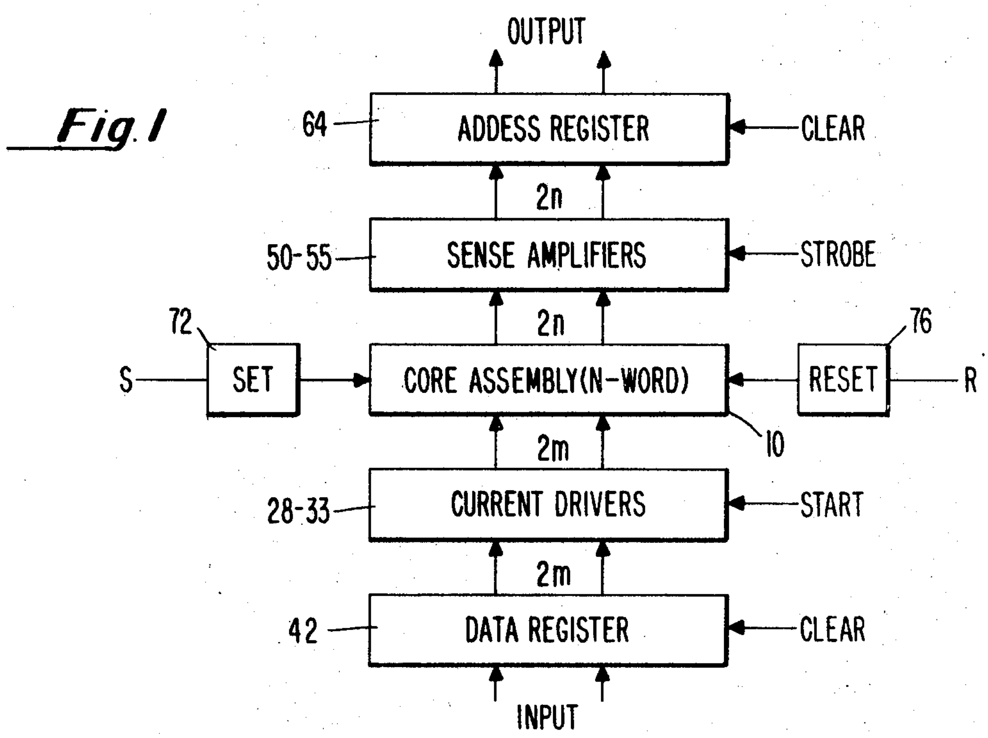
FIG. 1 is a block diagram of a fixed magnetic associative memory system according to the invention.
Figure 2:
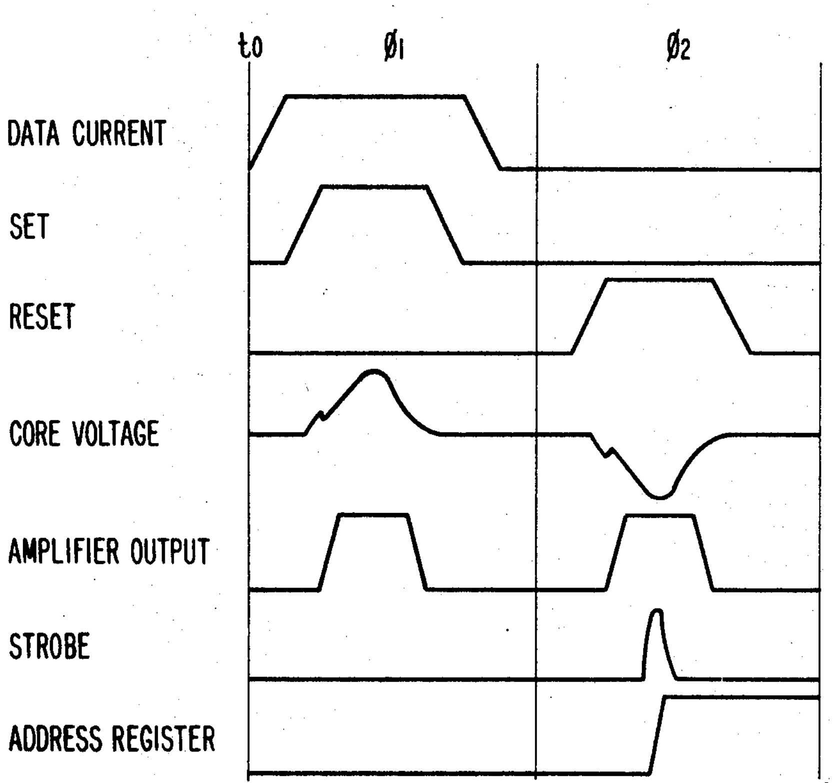
FIG. 2 is a timing diagram of waveforms involved in the operation of the invention.

A cycle of operation of the memory is preferably divided into two phases: a set phase $\phi_1$ (FIG. 2) followed by a reset phase $\phi_2$. However, the invention is not necessarily limited to this mode of operation.

In describing the operation, it will be assumed that the data word 101 has been placed into the flip-flops 44, 46 and 48 of the input data register 42, and that the address of the particular magnetic core which is storing that word is to be determined.

During the proper time in the memory cycle, those of the current drivers which are connected to the "true" lines are inhibited, and those which are connected to the "not true" lines are caused to fire. Thus, in the illustrative situation the current drivers 28, 31 and 32 fire to produce pulses of inhibit current in the input data conductors 15, 18 and 19. The direction of these currents is such as to effect further saturation of the magnetic cores. Because of the manner in which the data wiring is accomplished, all cores except one, as will appear shortly hereafter, receive one or more increments of inhibit data current tending to switch them further into saturation.

Simultaneously, a set driver 72 is pulsed to drive current in a set line 74 which threads all the cores, so that the set current passes through all the cores in the direction opposite to the inhibit current that is flowing in the input data conductors 15, 18 and 19. The set current is of sufficient magnitude to switch a core to the opposite state of flux, but inhibit data current in any input data conductor which threads the same core will prevent it from doing so. Because of the simultaneous action of the set driver 72 and the data current drivers 28, 31 and 32, there is a bucking effect between the set current and data current signals in the cores common to these currents.

The particular core #3 which was specifically wired for the data pattern 101 currently present on the input lines does not receive any current from the current drivers 28, 31 and 32 since the input address conductors 15, 18 and 19 that are coupled to these drivers bypass the selected core #3. However, the magnetomotive force of the current in the set line 74 is sufficient to set or switch core #3 to the opposite state of flux. This action induces by Lenz's law a voltage across the output address conductors 26, 23 and 21 which thread the switched core #3.

In the second timing phase $\phi_2$, a reset driver 76 is turned on to drive current through a reset line 78 in the same direction as the data drive current. The current in the reset line 78 will switch the set core #3 back to its original state so that voltage is again induced on the output address conductors 26, 23, and 21, but of opposite polarity.

After the second-phase voltages on the output address conductors 26, 23 and 21 are suitably amplified in the amplifiers 55, 52 and 50, and standardized, the output conductors 57, 60 and 62 become logically true for a certain interval of time and may then be strobed into the output address register 64 to store therein the binary address 011 of core #3 which is storing the input data word 101.

Therefore, application of the input data pattern during the set phase $\phi_1$ enables the address corresponding to that input data word to be automatically read out in parallel fashion during the reset phase $\phi_2$. Readout during the reset phase is preferable over readout during the set phase, since noise is at a relative minimum during the reset phase.

Immediately after the reset phase is completed, a new cycle with new input data may proceed.

Although strictly speaking, it is not necessary to wire both the true and the not true output address lines, certain advantages are obtained by doing so. For example, every bit of the address will be represented by a true signal (during strobe time) either on the binary 1 output lines 58, 60 or 62, or on the binary 0 output lines, 57, 59 or 61, so that only true signals will represent useful information.

This fact can be utilized in the following fashion. If the input data word whose address was requested is not stored in memory, no core will be switched and no output conductor 57–62 will be true at strobe time. This situation can readily be distinguished by logic circuitry to set up a condition which indicates this fact to the outside world, that is, that the particular data word is not stored in memory.

Also, if for some reason two or more cores are switched simultaneously, voltage will be induced on more than the normal number of output address conductors so that in one or more bits of the address both the binary 1 and the binary 0 lines will be true simultaneosuly. Thus if multiple output detection were required, the appropriate input signals to the detection logic would be available, that is, the output address signals from the memory.

While there has been shown and described a specific associative memory to exemplify the principles of the invention, it is to be understood that this is but one embodiment of the invention and that the invention is capable of being constructed in a variety of modifications without departing from its true spirit and scope. Accordingly, the invention is not to be limited by the specific memory disclosed, nor by the specific mode of operation, but only by the subjoined claims.

I claim:

1. An associative memory comprising a plurality of magnetic cores, a group of input data conductors each threading certain of said cores and bypassing the other cores in a coded pattern so that each core stores a data word, each said core having half of said input data conductors threading it and the other half bypassing it, a group of output address conductors each threading certain of said cores and bypassing the other cores in a coded pattern so that each core stores its address code, an input data register, an output address register, a drive winding threading all said cores, means for driving switching current through said drive winding capable to switch said cores from a reference state to a first state of magnetization, means for driving inhibit current through a selected half of said input data conductors in a pattern corresponding to an input data word in the input data register and in the direction opposite to said switching current so that all cores except the one that is storing said input data word will not switch, said selected half of said input data conductors bypassing said excepted core, switching means for disturbing the state of magnetization of said excepted core to induce signals on the output address conductors which thread said excepted core, and means for applying said induced signals for storing the address code of said excepted core in said output address register, and wherein said input data register is an *m*-bit register and there are 2*m* input data conductors, said input conductors are in pairs, each pair constituting a binary bit, the conductors of each pair representing respectively a binary one and a binary zero, each said pair being complementally associated with each said core so that if one output data conductor of a pair threads a given core the other input data conductor of the same pair bypasses said given core, said address register is an n-bit register and there are 2*n* output address conductors, said output address conductors are in pairs, each pair of said output address conductors constituting a binary bit, the conductors of each pair of output address conductors representing respectively a binary one and a binary zero, each said pair of output address conductors being complementally associated with each said core so that if one output address conductor of a pair threads a given core the other output address conductor of the same pair bypasses said given core, and wherein *n* may or may not be equal to *m*.

2. An associative memory according to claim 1 wherein said switching means comprises a second drive winding threading all said cores, and means for driving current through said second drive winding in the direction opposite to said switching current for resetting said excepted core to said reference state.

References Cited

Proceedings: Fall Joint Computer Conference, "The Rope Memory—A Permanent Storage Device," by Kuttner, 1963, pp. 45–57.

STANLEY M. URYNOWICZ, Jr., Primary Examiner